(12) United States Patent
Shaber

(10) Patent No.: US 11,126,387 B2
(45) Date of Patent: Sep. 21, 2021

(54) ACTIVATE SCANNERS FOR PRINTER BEACONS

(71) Applicant: Hewlett-Packard Development Company, L.P., Spring, TX (US)

(72) Inventor: David Jerome Shaber, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,085

(22) PCT Filed: May 14, 2018

(86) PCT No.: PCT/US2018/032573
§ 371 (c)(1),
(2) Date: Oct. 13, 2020

(87) PCT Pub. No.: WO2019/221696
PCT Pub. Date: Nov. 21, 2019

(65) Prior Publication Data
US 2021/0149614 A1    May 20, 2021

(51) Int. Cl.
*G06F 15/00* (2006.01)
*G06F 3/12* (2006.01)
*G06K 1/00* (2006.01)
*H04L 29/08* (2006.01)

(52) U.S. Cl.
CPC .......... *G06F 3/1292* (2013.01); *G06F 3/1204* (2013.01); *G06F 3/1256* (2013.01); *G06F 3/1271* (2013.01); *G06F 3/1288* (2013.01); *H04L 67/16* (2013.01)

(58) Field of Classification Search
CPC .... G06F 3/1292; G06F 3/1204; G06F 3/1256; G06F 3/1271; G06F 3/1288; H04L 67/16
USPC .............................. 358/1.15, 1.1, 1.14, 1.13
See application file for complete search history.

(56) References Cited

U.S. PATENT DOCUMENTS

| 9,753,684 B1 | 9/2017 | Najari et al. |
| 9,805,387 B2 | 10/2017 | Terashima et al. |
| 2009/0210932 A1 | 8/2009 | Balakrishnan et al. |
| 2011/0028091 A1 | 2/2011 | Higgins et al. |
| 2011/0242607 A1 | 10/2011 | Shenoy et al. |
| 2016/0252963 A1 | 9/2016 | Elkins et al. |
| 2017/0019389 A1 | 1/2017 | Shet et al. |
| 2017/0039007 A1* | 2/2017 | Nathani ............... G06F 3/1238 |

(Continued)

FOREIGN PATENT DOCUMENTS

CN    106408723    2/2017

*Primary Examiner* — Douglas Q Tran
(74) *Attorney, Agent, or Firm* — Mannava & Kang

(57) ABSTRACT

According to examples, an apparatus may include a processor and a memory. The memory may have stored thereon machine readable instructions that when executed by the processor, may cause the processor to detect an occurrence of an action on the apparatus. The instructions may cause the processor to, based on the detected occurrence of the action, determine whether a print job associated with a user of the apparatus stored at a print service storage is designated for printing. In addition, the instructions may cause the processor to, based on a determination that the print job associated with the user stored at the print service storage is designated for printing, activate a scanner to scan for wireless beacons of printers.

15 Claims, 7 Drawing Sheets

(56) References Cited

U.S. PATENT DOCUMENTS

2018/0027094 A1* 1/2018 Nishi .................... H04L 67/42
                                                                        709/205
2018/0124847 A1* 5/2018 Nishida ................ H04W 8/005

* cited by examiner

ACTIVATE SCANNERS FOR PRINTER BEACONS

BACKGROUND

Many types of printers have the ability to wirelessly connect to mobile devices, such as tablet computers, laptop computers, and smartphones. The mobile devices may connect wirelessly to the printers, for instance, through a cell phone network, Wi-Fi™ (wireless fidelity), or generic IEEE 802.11 connections to print a document.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote one of a particular element or multiple ones of the particular element. As used herein, the term "includes" means includes but not limited to, the term "including" means including but not limited to. The term "based on" may mean based in part on.

Disclosed herein are apparatuses and methods for activating a scanner to scan for wireless beacons of printers based on certain events occurring. That is, for instance, the scanner may be activated based on a determination that a user likely intends to submit a print job, e.g., a document, to be printed by a printer. In some examples, a user may be determined as likely intending to submit the print job for printing in instances in which the user performs an action on a mobile device and/or moves the mobile device in combination with a determination that a user print job is stored in a print service storage. By way of example, the scanner may not be activated in instances in which the mobile device is activated and/or moved but the user has not uploaded the user print job to the print service storage. Likewise, the scanner may not be activated in instances in which the user has uploaded a user print job to the print service storage but the mobile device is an inactive state and/or is not moving.

The scanner may be a hardware component that draws power from a power source of the mobile device, for instance, from a battery. Through implementation of the apparatuses and methods disclosed herein, the scanner may be activated in instances in which there is a higher likelihood that the user intends to print a document. That is, the scanner may be activated judiciously, which may result in the scanner consuming a reduced amount of power as compared with the scanner being activated continuously. As a result, the apparatuses and methods disclosed herein may enable a mobile device to consume less power, which may prolong a life of a battery of the mobile device.

Figure 1:
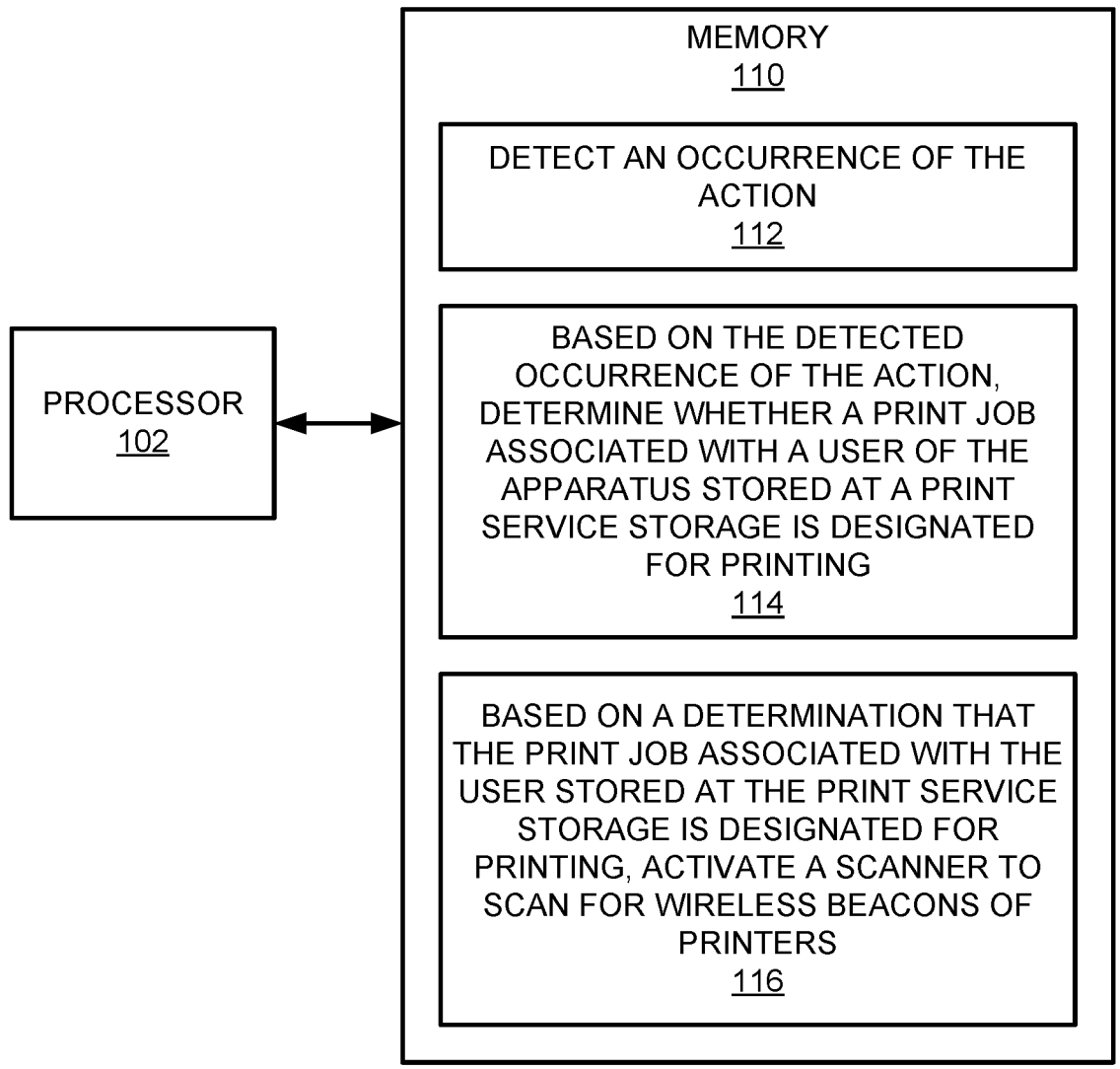
FIG. 1 depicts a block diagram of an example apparatus that may activate a scanner to scan for wireless beacons of printers based on certain events occurring.
Figure 2:
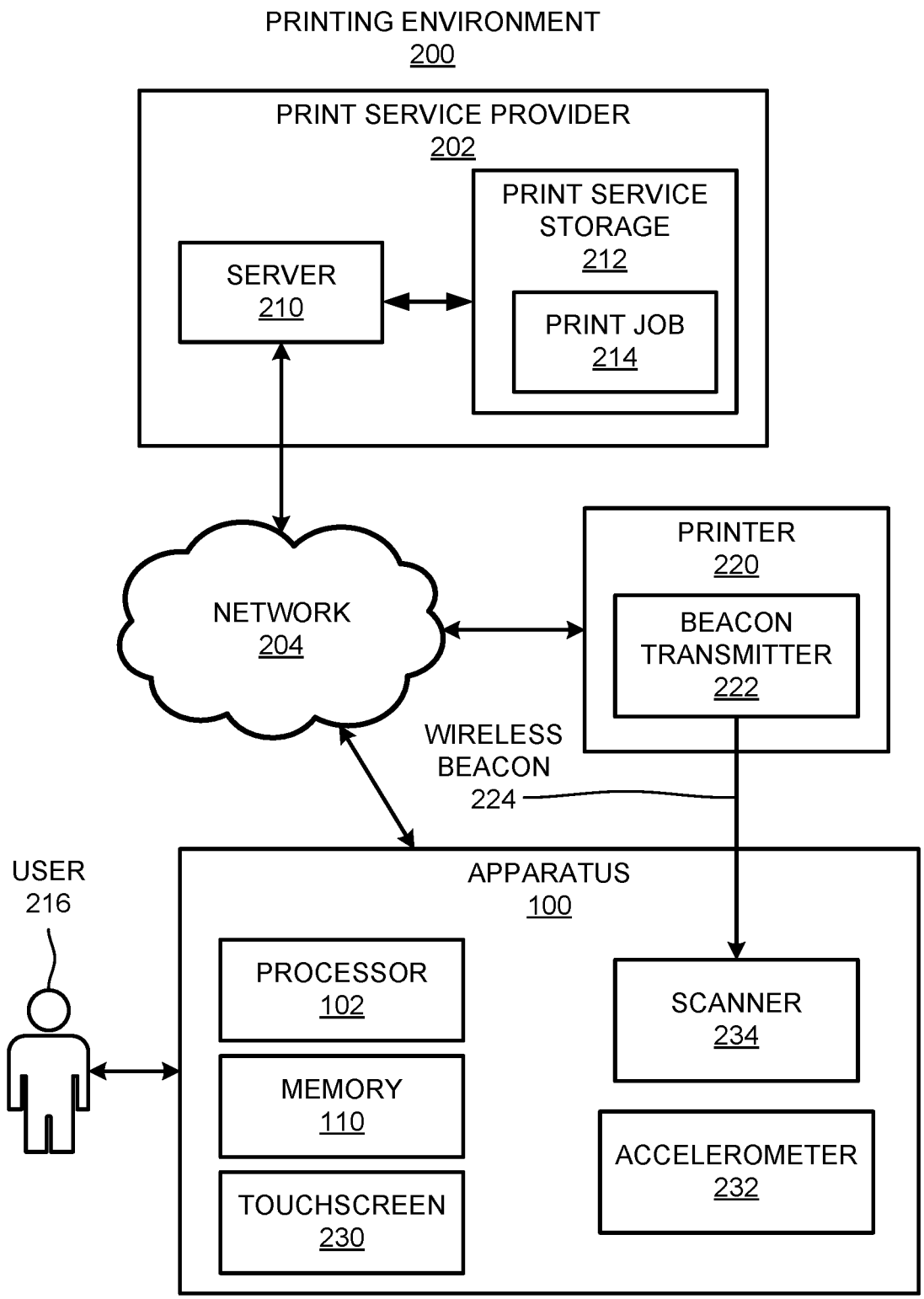
FIG. 2 depicts a block diagram of an example printing environment within which the apparatus depicted in FIG. 1 may be implemented.

Reference is first made to FIGS. 1 and 2. FIG. 1 shows a block diagram of an example apparatus 100 that may activate a scanner to scan for wireless beacons of printers based on certain events being detected to have occurred. FIG. 2 shows a block diagram of an example printing environment 200 within which the apparatus 100 may be implemented. It should be understood that the example apparatus 100 depicted in FIG. 1 and/or the printing environment 200 depicted in FIG. 2 may include additional features and that some of the features described herein may be removed and/or modified without departing from the scopes of the apparatus 100 and/or the printing environment 200.

According to examples, the apparatus 100 depicted in FIG. 1 may be a mobile device that a user may carry, such as a smartphone, a tablet computer, a laptop computer, or the like. In addition, the apparatus 100 may be implemented in a printing environment 200 as shown in FIG. 2. Particularly, the apparatus 100 may communicate with a print service provider 202 via a network 204, which may be the Internet, a cellular network, and/or the like. The print service provider 202 may provide printing services to the apparatus 100 as well as other apparatuses (not shown). That is, for instance, the print service provider 202 may receive and store print jobs, e.g., electronic documents submitted to be printed, from the apparatus(es) 100 via the network 204. In some examples, the print service provider 202 may control the storage and communication of the print jobs to a printer 220 or to multiple printers.

As shown, the print service provider 202 may include a server 210 and a print service storage 212. The print service provider 202 may be a cloud-based service provider and the printer service storage 212 may be a cloud-based storage. As also shown, a print job 214, which may also be termed a user print job 214 herein, may also be stored on the print service storage 212. The print job 214 may be associated with a user 216 of the apparatus 100, e.g., submitted by the user 216. In some examples, the print job 214 may be associated with the user 216 through inclusion of a user 216 identifier to the print job 214 stored in the print service storage 212. In any regard, a user 216 of the apparatus 100 may have uploaded the print job 214 to the print service provider 202 through the apparatus 100 or through another computing device. In addition, the storage of the print job 214 in the print service storage 212 may be an indication that the print job 214 is designated for printing. That is, the user 216 may have uploaded the print job 214 to the print service provider 202 with the intent that the print job 214 be printed based on certain events occurring. One of the events may be that the print job 214 be printed when the apparatus 100 is within a certain range of a printer 220 that the user 216 of the apparatus 100 or the apparatus 100 is authorized to print. Additional descriptions of the certain events are discussed in detail herein.

As also shown in FIG. 2, the printer 220 may be connected to the network 204. In some examples, in instances in which the certain events have occurred, the server 210 may communicate the print job 214 to the printer 220 via the network 204 for the printer 220 to print. Although a single network 204 is shown, it should be understood that the printing environment 200 may include multiple networks 204. That is, for instance, the apparatus 100 may communicate with the print service provider 202 via a first network 204, e.g., a cellular network, and the print service provider 202 may communicate with the printer 220 via a second network 204, e.g., the Internet. In addition, although a single printer 220 is depicted in FIG. 2, the printing environment 200 may include additional printers having beacon transmitters without departing from a scope of the present disclosure.

In addition to printing components (not shown) to print the print job 214 as well as other components, the printer 220 may include a beacon transmitter 222. The beacon transmitter 222 may transmit a wireless beacon 224 for receipt by the apparatus 100 and/or other apparatuses. The beacon transmitter 222 may transmit the wireless beacon 224 using any of a number of different wireless beacon protocols. For instance, the beacon transmitter 222 may use the Bluetooth™ wireless protocol, a generic IEEE 802.11 protocol, or the like. In any regard, the wireless beacon 224 may include information about where to find the printer 220, for printing, e.g. an Internet protocol (IP) address, a printer identifier (ID), and/or the like. Although the beacon transmitter 222 has been depicted as being part of the printer 220, it should be understood that the beacon transmitter 222 may be external to the printer 220 without departing from a scope of the present disclosure.

With reference to FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, the apparatus 100 may include multiple processors 102 without departing from a scope of the apparatus 100.

The apparatus 100 may also include a memory 110 that may have stored thereon machine readable instructions 112-116 that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a non-transitory machine-readable storage medium, where the term "non-transitory" does not encompass transitory propagating signals.

The processor 102 may fetch, decode, and execute the instructions 112 to detect an occurrence of an action on the apparatus 100. According to examples, the action may be a user interaction with the apparatus 100 that causes the apparatus 100 to be powered on, awake from a sleep mode, or the like. The user interaction may be, for instance, a user 216 touch on a touchscreen 230 (FIG. 2) of the apparatus 100, an activation of a power and/or a home button on the apparatus 100, or the like. In addition or in other examples, the action may be a detected movement of the apparatus 100 such as movements detected by an accelerometer 232 of the apparatus 100. By way of example, the processor 102 may detect the occurrence of the action based on the accelerometer detecting that the apparatus 100 has moved beyond a predefined threshold distance within a predefined time period. For instance, the processor 102 may detect the occurrence of the action in instances in which the processor 102 determines that the apparatus 100 is moved a certain distance, e.g., a foot, ten feet, etc., is moved in a certain direction, or the like.

The processor 102 may fetch, decode, and execute the instructions 114 to, based on the detected occurrence of the action, determine whether a print job 214 associated with a user 216 of the apparatus 100 stored at a print service storage 212 is designated for printing. According to examples, the processor 102 may, based on the detected occurrence of the action, contact the server 210 of the print service provider 202 to determine whether a user print job 214 is stored in the print service storage 212. In addition, the processor 102 may determine from the server 210 whether the user print job 214 is designated to be printed. For instance, the user 216 of the user print job 214 may have stored the user print job 214 on the print service storage 212 but may not have designated the user print job 214 to be printed. In other examples, however, the storage of the user print job 214 itself on the print service storage 212 may be an indication that the user print job 214 is designated for printing. In any regard, the server 210 may return a response to the processor 102 regarding whether the user print job 214 is stored in the print service storage 212 and/or whether the user print job 214 is designated for printing.

In other examples, for instance, in which the apparatus 100 was used to upload the print job 214, information indicating that the print job 214 was uploaded to the print service provider 202 may be stored in the memory 110 or another data store in the apparatus 100. In these examples, the processor 102 may, based on the detected occurrence of the action, determine from the information stored on the apparatus 100, whether the user print job 214 is stored at the print service storage 212 and/or the user print job 214 is designated for printing.

The processor 102 may fetch, decode, and execute the instructions 116 to, based on a determination that the print job 214 associated with the user 216 (user print job 214) stored at the print service storage 212 is designated for printing, activate a scanner 234 to scan for wireless beacons 224 of printers 220. When activated, the scanner 234 may scan or monitor for a wireless beacon 224 from the printer 220 and/or wireless beacons 224 from any sufficiently nearby printers 220. The scanner 234 may thus include a hardware device, e.g., an antenna, that may receive the wireless beacon 224 when the apparatus 100 is within a signal range of the beacon transmitter 222, which may be based, for instance, on a signal strength of the beacon transmitter 222.

According to examples, the processor 102 may activate the scanner 234 only when the certain events have occurred. As discussed herein, the certain events may include the action occurrence being detected and the print job 214 associated with the user 216 (e.g., user print job) being stored in the print service storage 212 and/or being designated to be printed. In this regard, instead of the scanner 234 being continuously activated, the processor 102 may activate the scanner 234 in instances in which there is a likelihood that the user 216 of the apparatus 100 intends to release the print job 214 for printing as evidenced by the occurrence of the certain events. As a result, the scanner 234 may be activated for relatively short durations of time, which may reduce energy consumed by the scanner 234 and thus, may conserve battery power in the apparatus 100.

Instead of the memory 110, the apparatus 100 may include hardware logic blocks that may perform functions similar to the instructions 112-116. In other examples, the apparatus 100 may include a combination of instructions and hardware logic blocks to implement or execute functions corresponding to the instructions 112-116. In any of these examples, the processor 102 may implement the hardware logic blocks and/or execute the instructions 112-116. As discussed herein, the apparatus 100 may also include additional instructions and/or hardware logic blocks such that the processor 102 may execute operations in addition to or in place of those discussed above with respect to FIG. 1.

Figure 3:
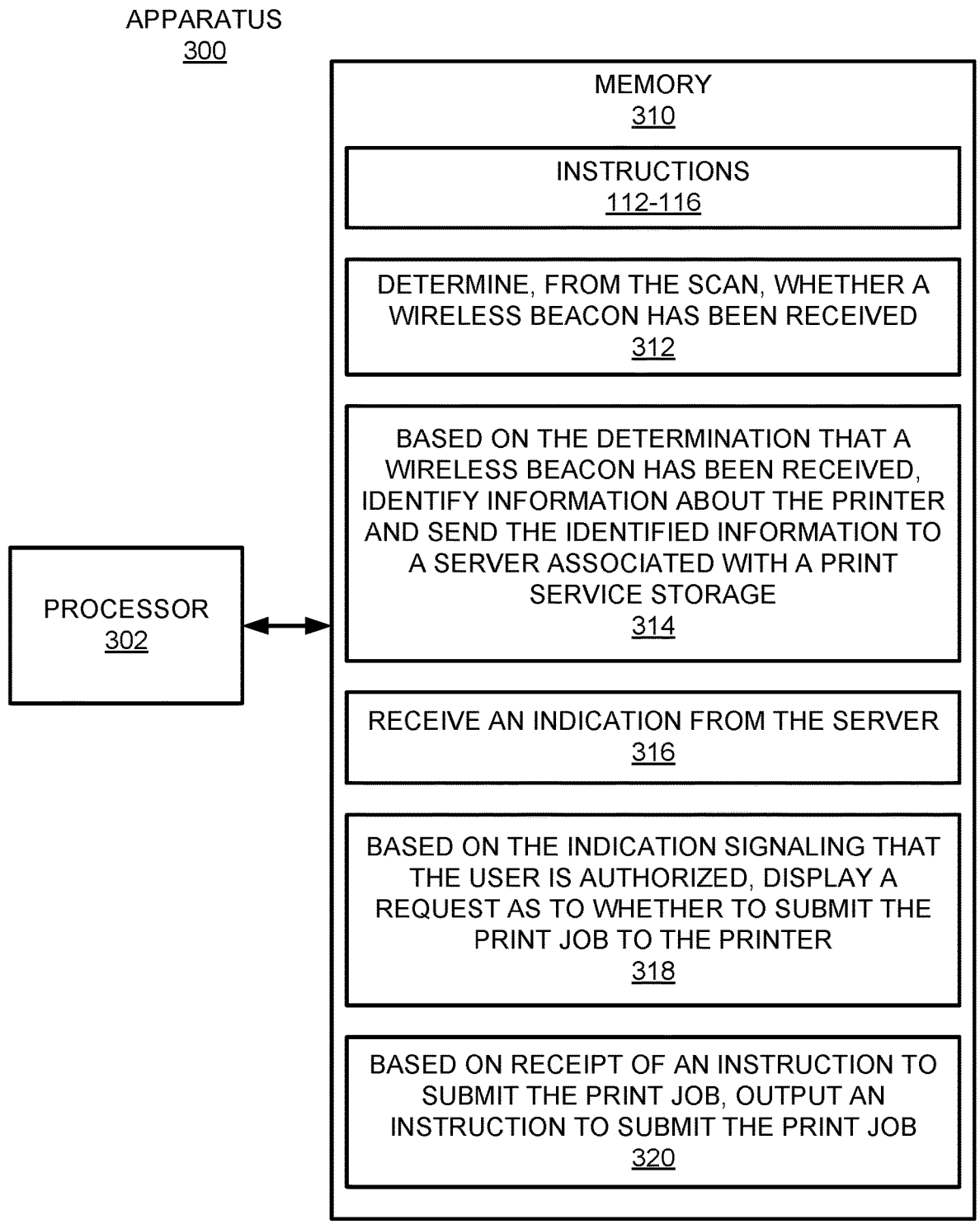
FIG. 3 shows a block diagram of another example apparatus that may activate a scanner to scan for wireless beacons of printers based on certain events occurring.

Reference is now made to FIG. 3, which shows a block diagram of another example apparatus 300 that may activate a scanner to scan for wireless beacons of printers based on certain events occurring. It should be understood that the example apparatus 300 depicted in FIG. 3 may include additional features and that some of the features described herein may be removed and/or modified without departing from the scopes of the apparatus 300. The description of the apparatus 300 is also made with reference to FIGS. 1 and 2.

According to examples, the apparatus 300 may be equivalent to the apparatus 100 depicted in FIG. 1 and may replace the apparatus 100 depicted in FIG. 2. As shown in FIG. 3, the apparatus 300 may include a processor 302 that may control operations of the apparatus 300. The processor 302 may be equivalent to the processor 102 depicted in FIG. 1. Although the apparatus 300 has been depicted as including a single processor 302, the apparatus 300 may include multiple processors 302 without departing from a scope of the apparatus 300.

The apparatus 300 may also include a memory 310, which may be equivalent to the memory 110, that may have stored thereon machine readable instructions 112-116 and 312-320 that the processor 302 may execute. The memory 310 may be a non-transitory machine readable medium. The processor 302 may fetch, decode, and execute the instructions 112-116 as discussed above with respect to FIG. 1. The processor 302 may also fetch, decode, and execute the instructions 312-320 following execution of the instructions 112-116.

The processor 302 may fetch, decode, and execute the instructions 312 to determine, from the scan, whether a wireless beacon 224 of a printer 220 has been received. As discussed herein, the scanner 234 may receive the wireless beacon 224 of the printer 220 when the scanner 234 is within a certain distance from the beacon transmitter 222. The certain distance may be a distance that the beacon transmitter 222 transmits the wireless beacon 224 as may be controlled by the signal strength of the wireless beacon 224.

The processor 302 may fetch, decode, and execute the instructions 314 to, based on a determination that a wireless beacon 224 of a printer 220 has been received, identify information about the printer 220 from the wireless beacon 224. The information about the printer 220 may be, for instance, an IP address of the printer 220, a printer 220 identifier (ID), and/or the like. The processor 302 may also send the identified information to a server 210 associated with the print service storage 212. As shown in FIG. 2, the server 210 may be associated with, e.g., part of a print service provider 202.

The processor 302 may fetch, decode, and execute the instructions 316 to receive an indication from the server 210 regarding whether the user 216 is authorized to print the print job 214 at the printer 220. That is, for instance, the server 210 may determine whether the user 216 is authorized to print the print job 214 at the printer 220 and may send the indication to signal whether the user 216 is so authorized to the apparatus 100. The server 210 may determine whether the user 216 is authorized to print at the printer 220 through any suitable authorization determination process. For instance, the user 216 may provide a user ID or other form of identification to the server 210 and the server 210 may compare that information with previously stored information of users that are authorized to print to the printer 220. In other examples, the server 210 may determine whether the printer 220 is authorized to execute print jobs for the user.

The processor 302 may fetch, decode, and execute the instructions 318 to, based on the indication signaling that the user 216 is authorized to print the print job 214 at the printer 220, display a request as to whether to submit the print job 214 to the printer 220. For instance, the processor 302 may display a request on the touchscreen 230 for the user 216 to verify that the user 216 intends to submit the print job 214 for printing at the printer 220. However, based on the indication signaling that the user 216 is not authorized to print the print job 214 at the printer 220, the processor 302 may display an indication that the user 216 may not be authorized to print at the printer 220. In other examples, the processor 302 may not inform the user 216 of this information and may continue to monitor for other wireless beacons, for instance, while the certain events, e.g., triggering events, are active.

The processor 302 may fetch, decode, and execute the instructions 320 to, based on receipt of an instruction to submit the print job 214 from the user 216, output an instruction to the server 210 to submit the print job 214 to the printer 220. In response, the server 210 may send a wake-up instruction to the printer 220 and may also submit the print job 214 to the printer 220, for instance, through the network 204. However, the processor 302 may, based on receipt of an instruction to not submit the print job 214, not send an instruction to the server 210. As a result, the server 210 may not send the wake-up instruction or submit the print job 214.

Instead of the memory 310, the apparatus 300 may include hardware logic blocks that may perform functions similar to the instructions 112-116 and 312-320. In other examples, the apparatus 300 may include a combination of instructions and hardware logic blocks to implement or execute functions corresponding to the instructions 112-116 and 312-320. In any of these examples, the processor 302 may implement the hardware logic blocks and/or execute the instructions 112-116 and 312-320. As discussed herein, the apparatus 300 may also include additional instructions and/or hardware logic blocks such that the processor 302 may execute operations in addition to or in place of those discussed above with respect to FIG. 3.

Figure 4:
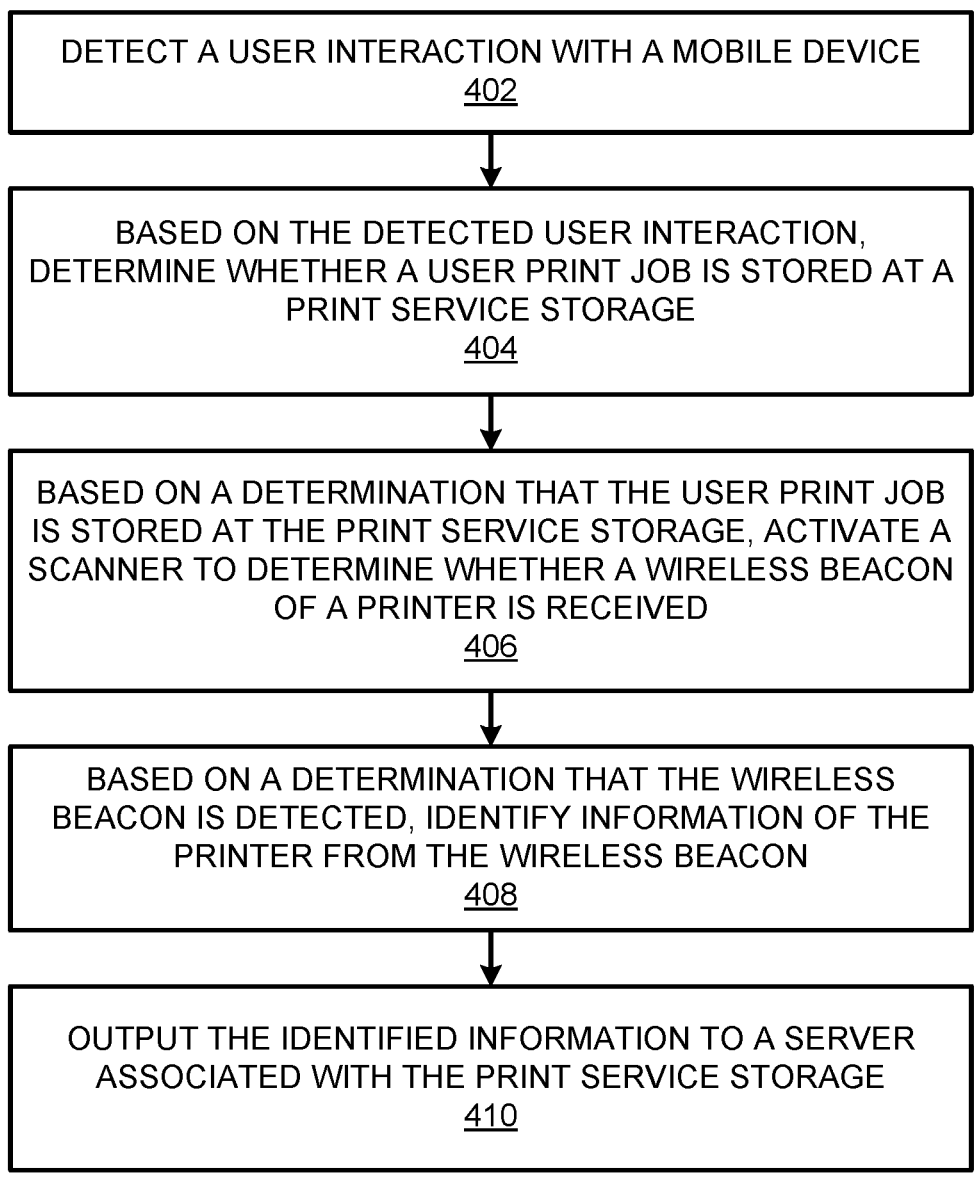
FIGS. 4 and 5A-5B, respectively, depict flow diagrams of example methods for scanning for wireless beacons of printers based on certain events occurring on a mobile device.
Figure 5A:
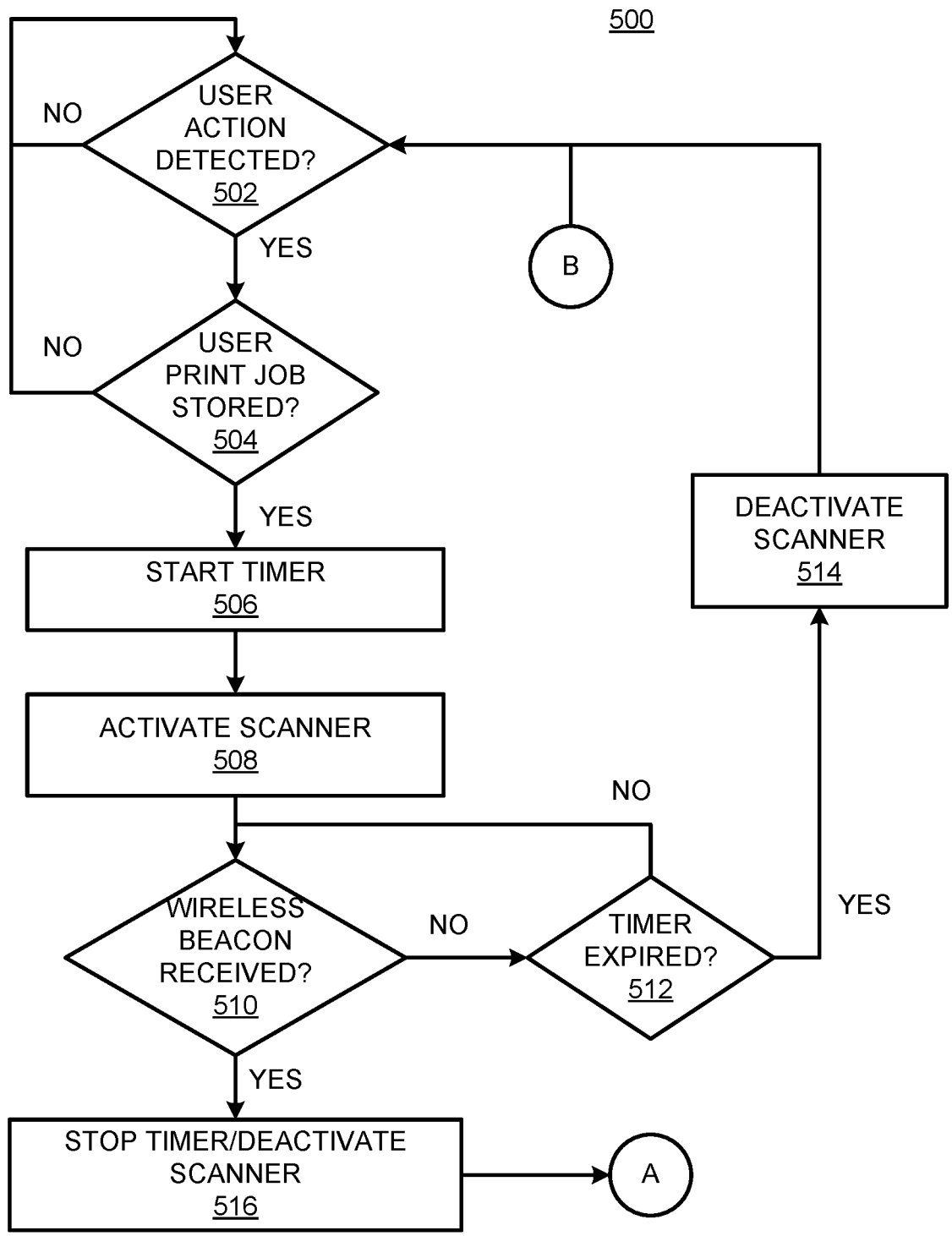
Figure 5B:
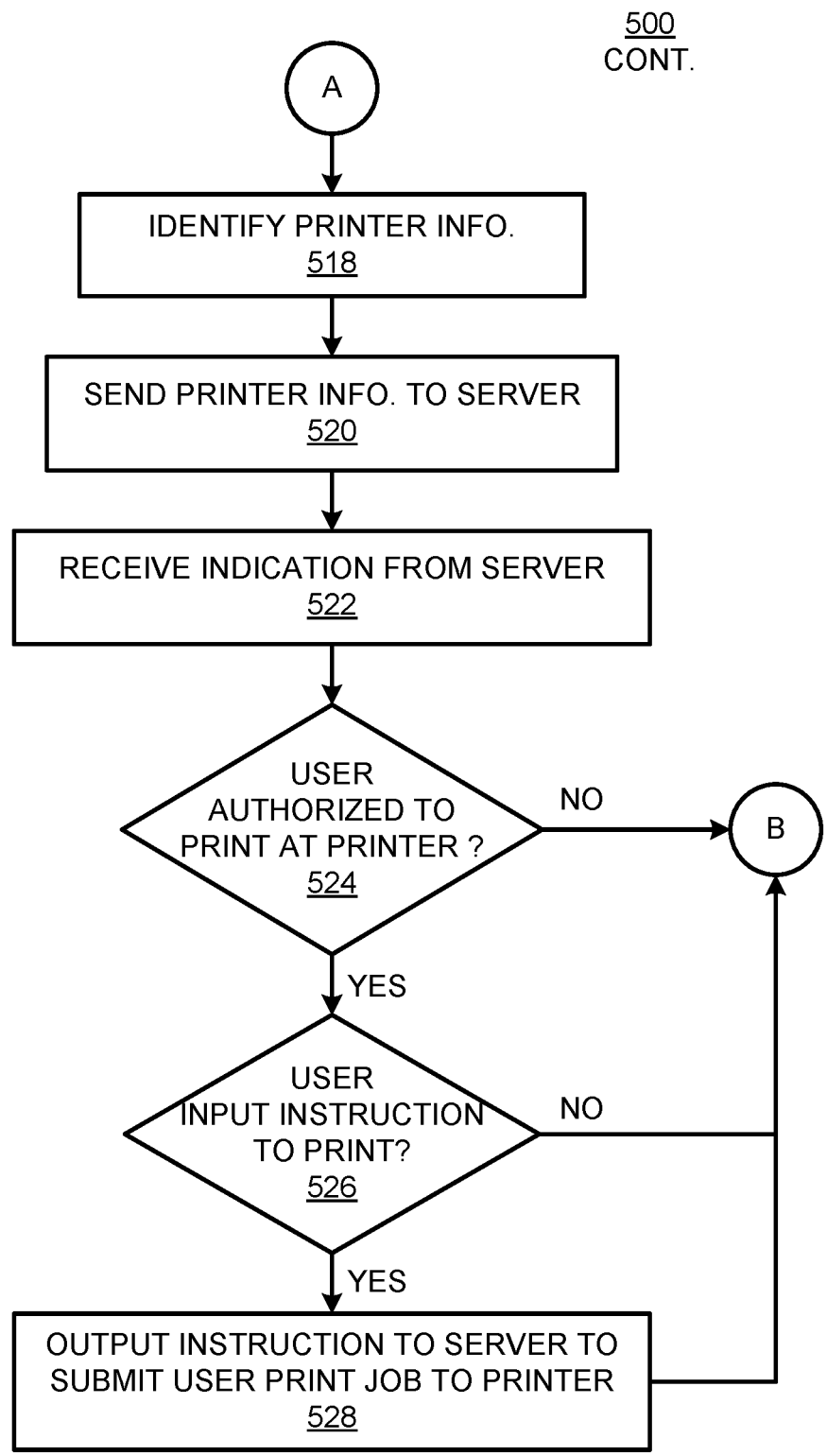

Various manners in which the processor 102, 302 may operate are discussed in greater detail with respect to the methods 400 and 500 depicted in FIGS. 4 and 5A-5B. Particularly, FIGS. 4 and 5A-5B, respectively, depict flow diagrams of example methods 400 and 500 for scanning for wireless beacons of printers based on certain events occurring on a mobile device. It should be understood that the methods 400 and 500 depicted in FIGS. 4 and 5A-5B may include additional operations and that some of the operations described therein may be removed and/or modified without departing from the scopes of the methods 400 and 500. The descriptions of the methods 400 and 500 are made with reference to the features depicted in FIGS. 1-3 for purposes of illustration.

With reference first to FIG. 4, at block 402, the processor 102, 302 may detect a user interaction with a mobile device 100, 300. As discussed herein, the mobile device 100, 300 may be equivalent to either of the apparatuses depicted in FIGS. 1-3. In addition, the user interaction may be a movement of the mobile device 100, 300, a touch on the touchscreen 230, an activation of a power button, or the like.

At block 404, the processor 102, 302 may, based on the detected user interaction, determine whether a user print job 214 is stored at a print service storage 212. The processor 102, 302 may make this determination through a communication with the server 210, based on information stored on the apparatus 100, or from another source.

At block 406, the processor 102, 302 may, based on a determination that the user print job 214 is stored at the print service storage 212, activate a scanner 234 to determine whether a wireless beacon 224 of a printer 220 is received. For instance, the processor 102, 302 may activate the scanner 234 based on a determination that the user interacted with the mobile device 100, 300 and that the user print job 214 is stored at the print service storage 212. In one regard, therefore, the processor 102, 302 may activate the scanner 234 only when such triggering events are determined to have occurred to thus reduce energy consumed by the scanner 234.

At block 408, the processor 102, 302 may, based on a determination that the wireless beacon 224 is received, identify information of the printer 220 from the wireless beacon 224. The information of the printer 220 may include, for instance, an identifier of the printer 220, a location of the printer 220, etc. In addition, at block 410, the processor 102, 302 may output the identified information to a server 210 associated with the print service storage 212. That is, the processor 102, 302 may output the identified information of the printer 220 to the server 210 of a print service provider 202 that manages the user print job 214.

Turning now to FIGS. 5A and 5B, at block 502, the processor 102, 302 may determine whether a user action with the mobile device 100, 300 is detected. Based on a determination that a user action with the mobile device 100, 300 is not detected, the processor 102, 302 may continue to determine whether a user action with a mobile device 100, 300 is detected at block 502. However, based on a determination that a user action with the mobile device 100, 300 has been detected at block 502, the processor 102, 302 may, at block 504, determine whether a user print job 214 has been stored at the print service storage 212. Based on a determination that a user print job 214 is not stored in the print service storage 212, the processor 102, 302 they continue to determine whether a user action with a mobile device 100, 300 is detected at block 502.

However, based on a determination that a user print job 214 is stored at the print service storage 212, at block 506, the processor 102, 302 may start a timer. In addition, at block 508, the processor 102, 302 may activate the scanner 234. At block 510, the processor 102, 302 may determine whether a wireless beacon 224 has been received. Based on a determination that the wireless beacon 224 has not been received, the processor 102, 302 may determine whether the timer has expired at block 512. That is, for instance, the timer may be set to expire after a predefined period of time following activation of the timer, e.g., a few minutes, or the like. The processor 102, 302 may continue to determine whether the wireless beacon 224 has been received at block 510 until a determination is made that the timer has expired at block 512 or that the wireless beacon 224 has been received. Based on a determination that the timer has expired, the processor 102, 302 may deactivate the scanner 234 at block 514 and may return to block 502.

In other examples, instead of or in addition to implementing a timer to control a length of time during which the scanner 234 is active, the processor 102, 302 may control a length of time during which the scanner 234 is active using other factors. For instance, the processor 102, 302 may keep the scanner 234 active as long as the user action is determined to be active, while the touchscreen 230 is active following a determination that the user print job 214 is stored at the print service storage 212, or the like.

Based on a determination at block 510 that the wireless beacon 224 has been received, the processor 102, 302 may stop the timer and may deactivate the scanner 234 as indicated at block 516. In examples in which the timer is not implemented, the processor 102, 302 may deactivate the scanner 234 at block 516. In addition, at block 518 (FIG. 5B), the processor 102, 302 may identify information about the printer 220. For instance, the wireless beacon 224 may include the information about the printer 220 and the processor 102, 302 may identify the printer 220 information from the information contained in the wireless beacon 224.

At block 520, the processor 102, 302 may send the printer information to the server 210 of the print service provider 202. The server 210 may determine whether the user 216 is authorized to print at the printer 220. For instance, the server 210 may use information pertaining to the user 216 and the printer 220 to make this determination. In addition, at block 522, the processor 102, 302 may receive an indication from the server 210 as to whether or not the user 216 is authorized to print at the printer 220. Based on a determination that the indication signals that the user 216 is not authorized to print at the printer 220, the processor 102, 302 may return to block 502 as shown in FIG. 5A.

However, based on a determination that the indication signals that the user 216 is authorized to print at the printer 220, the processor 102, 302 may determine whether the user 216 has inputted an instruction to submit the user print job 214 to the printer 220. That is, for instance, the processor 102, 302 may cause a request as to whether the user 216 would like to submit the print job 214 to be displayed on the touchscreen 230. In addition, the processor 102, 302 may determine whether the user 216 selected to submit the print job 214 or not.

Based on a determination that the user 216 selected not to submit the print job 214, the processor 102, 302 may return to block 502 as shown in FIG. 5A. However, based on a determination that the user 216 selected to submit the print job 214, at block 528, the processor 102, 302 may output an instruction to the server 210 to submit the print job 214 to the printer 220. In addition, the processor 102, 302 may return to block 502. In response to receipt of the instruction, the server 210 may cause the print job 214 to be submitted to the printer 220, for instance, via the network 204.

Some or all of the operations set forth in the methods 400 and 500 may be included as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 6:
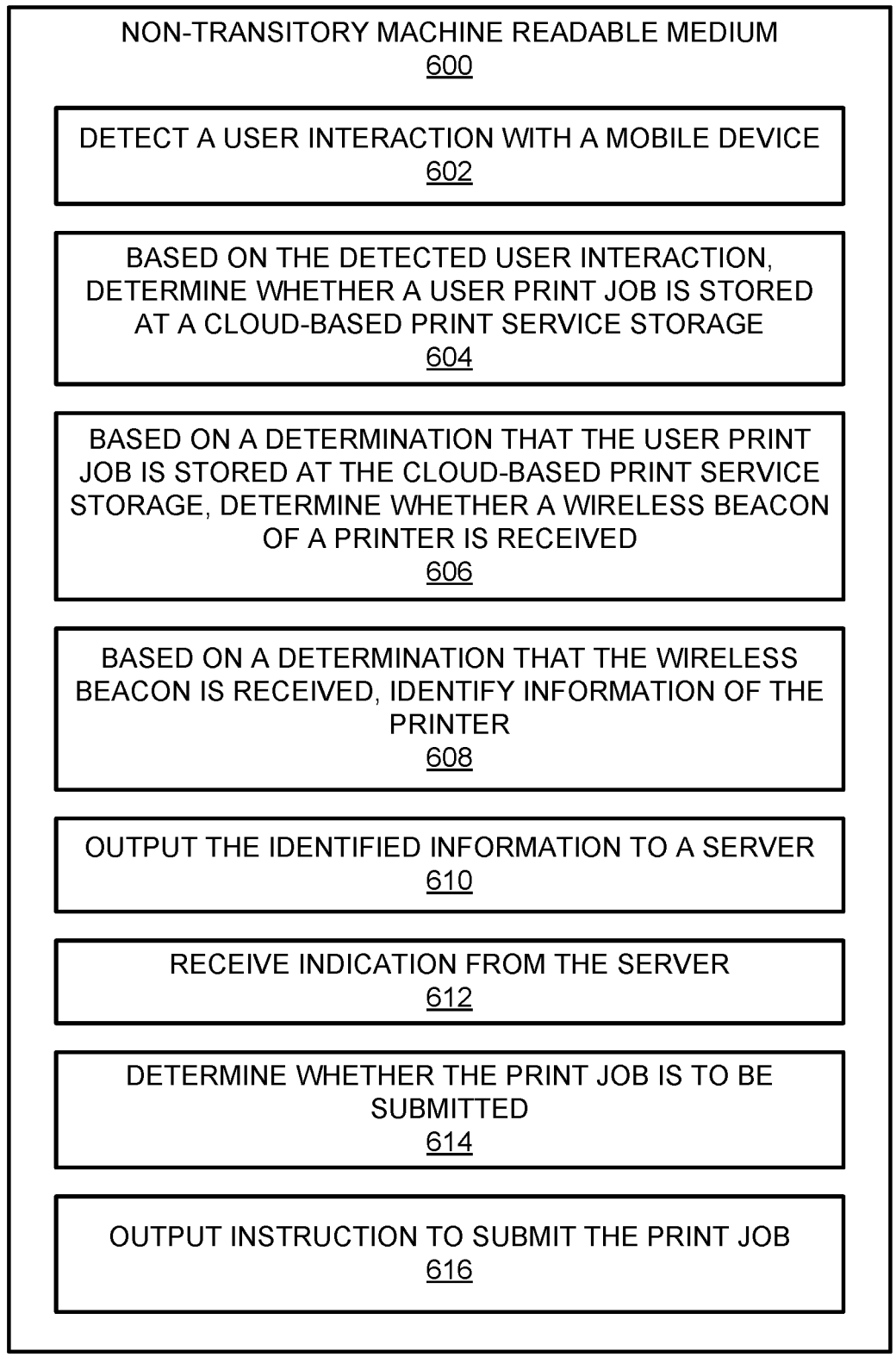
FIG. 6. shows an example non-transitory machine-readable storage medium for determining whether a wireless beacon of a printer is received based on certain events occurring on a mobile device.

Turning now to FIG. 6, there is shown an example non-transitory machine-readable storage medium 600 for determining whether a wireless beacon of a printer is received based on certain events occurring on a mobile device. The machine-readable storage medium 600 may be an electronic, magnetic, optical, or other physical storage device that contains or stores executable instructions. The machine-readable storage medium 600 may be, for example, Random Access memory (RAM), an Electrically Erasable Programmable Read-Only Memory (EEPROM), a storage device, an optical disc, and the like.

The non-transitory machine-readable storage medium 600 may have stored thereon machine readable instructions 602-616 that a processor, e.g., the processor 102, 302 may execute. The machine readable instructions 602 may cause the processor to detect a user 216 interaction with a mobile device 100, 300. The machine readable instructions 604 may cause the processor to, based on the detected user interaction, determine whether a user print job 214 is stored at a cloud-based print service storage 212. The machine readable instructions 606 may cause the processor to, based on a determination that the user print job 214 is stored at the cloud-based print service storage 212, determine whether a wireless beacon 224 of a printer 220 is received. The machine readable instructions 608 may cause the processor to, based on a determination that the wireless beacon is received, identify information of the printer. The machine readable instructions 610 may cause the processor to output the identified information to a server 210 associated with the cloud-based print service storage 212.

The machine readable instructions 612 may cause the processor to receive an indication from the server 210 regarding whether the user 216 is authorized to print the print job 214 at the printer 220. The machine readable instructions 614 may cause the processor to, based on the indication signaling that the user 216 is authorized to print the print job 214 at the printer 220, determine whether the user 216 has inputted an instruction to submit the print job 214 to the printer 220. The machine readable instructions 616 may cause the processor to, based on receipt of the instruction to print, output an instruction to the server 210 to submit the print job 214 to the printer 220.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine readable instructions that are to cause the processor to:
      detect an occurrence of an action on the apparatus;
      based on the detected occurrence of the action, determine whether a print job associated with a user of the apparatus stored at a print service storage is designated for printing; and
      based on a determination that the print job associated with the user stored at the print service storage is designated for printing, activate a scanner to scan for wireless beacons of printers.

2. The apparatus of claim 1, wherein the instructions are further to cause the processor to:
   determine, from the scan, whether a wireless beacon of a printer has been received;
   based on a determination that a wireless beacon of a printer has been received,
      identify information about the printer from the wireless beacon; and
      send the identified information to a server associated with the print service storage.

3. The apparatus of claim 2, wherein the server associated with the print service storage is to determine whether the user is authorized to print the print job at the printer, and wherein the instructions are further to cause the processor to:
   receive an indication from the server regarding whether the user is authorized to print the print job at the printer;
   based on the indication signaling that the user is authorized to print the print job at the printer, display a request as to whether to submit the print job to the printer; and
   based on receipt of an instruction to submit the print job, output an instruction to the server to submit the print job to the printer.

4. The apparatus of claim 3, wherein the print service storage is a cloud-based storage, and wherein the instructions are further to cause the processor to output the instruction to the server to instruct the server to communicate the print job to the printer.

5. The apparatus of claim 1, further comprising:
   a touchscreen, wherein the occurrence of the action comprises a detection of a touch on the touchscreen.

6. The apparatus of claim 1, further comprising:
   an accelerometer, wherein the occurrence of the action comprises a detection by the accelerometer of a movement of the apparatus.

7. The apparatus of claim 1, wherein the instructions are further cause the processor only scan for the wireless beacons of the printer in response to the determination that the print job associated with the user is designated for printing.

8. A method comprising:
   detecting, by a processor, a user interaction with a mobile device;
   based on the detected user interaction, determining, by the processor, whether a user print job is stored at a print service storage;
   based on a determination that the user print job is stored at the print service storage, activating, by the processor, a scanner to determine whether a wireless beacon of a printer is received;
   based on a determination that the wireless beacon is received, identify, by the processor, information of the printer from the wireless beacon; and
   output, by the processor, the identified information to a server associated with the print service storage.

9. The method of claim 8, wherein the server associated with the print service storage is to determine whether the user is authorized to print the user print job at the printer, the method further comprising:
   receiving an indication from the server regarding whether the user is authorized to print the user print job at the printer;
   based on the indication signaling that the user is authorized to print the user print job at the printer, determining whether the user has inputted an instruction to submit the user print job to the printer; and
   based on receipt of the instruction to print the user print job, outputting an instruction to the server to submit the user print job to the printer.

10. The method of claim 8, wherein detecting the user interaction with the mobile device further comprises detecting that the user physically contacted the mobile device.

11. The method of claim 8, wherein detecting the user interaction with the mobile device further comprises detecting movement of the mobile device beyond a predefined threshold.

12. The method of claim 8, wherein activating the scanner further comprises activating the scanner to scan to determine whether the wireless beacon of the printer is received in response to the determination that the user print job is designated for printing.

13. A non-transitory machine readable medium on which is stored machine readable instructions that when executed by a processor are to cause the processor to:
   detect a user interaction with a mobile device;
   based on the detected user interaction, determine whether a user print job is stored at a cloud-based print service storage;
   based on a determination that the user print job is stored at the cloud-based print service storage, determine whether a wireless beacon of a printer is received.

14. The non-transitory machine readable medium of claim 13, wherein the instructions are further to cause the processor to:
   based on a determination that the wireless beacon is received, identify information of the printer;
   output the identified information to a server associated with the cloud-based print service storage;
   receive an indication from the server regarding whether the user is authorized to print the print job at the printer;
   based on the indication signaling that the user is authorized to print the print job at the printer, determine whether the user has inputted an instruction to print the print job to the printer; and
   based on receipt of the instruction to submit the print job, output an instruction to the server to submit the print job to the printer.

15. The non-transitory machine readable medium of claim 13, wherein, to detect the user interaction with the mobile device, the instructions are further to cause the processor to:
   detect one of a movement of the mobile device beyond a predefined threshold or a physical contact by the user on the mobile device.

* * * * *